No. 632,021. Patented Aug. 29, 1899.
A. S. PECK.
MACHINE FOR GATHERING AND LOADING HAY.
(Application filed Nov. 27, 1896.)
(No Model.) 4 Sheets—Sheet 1.
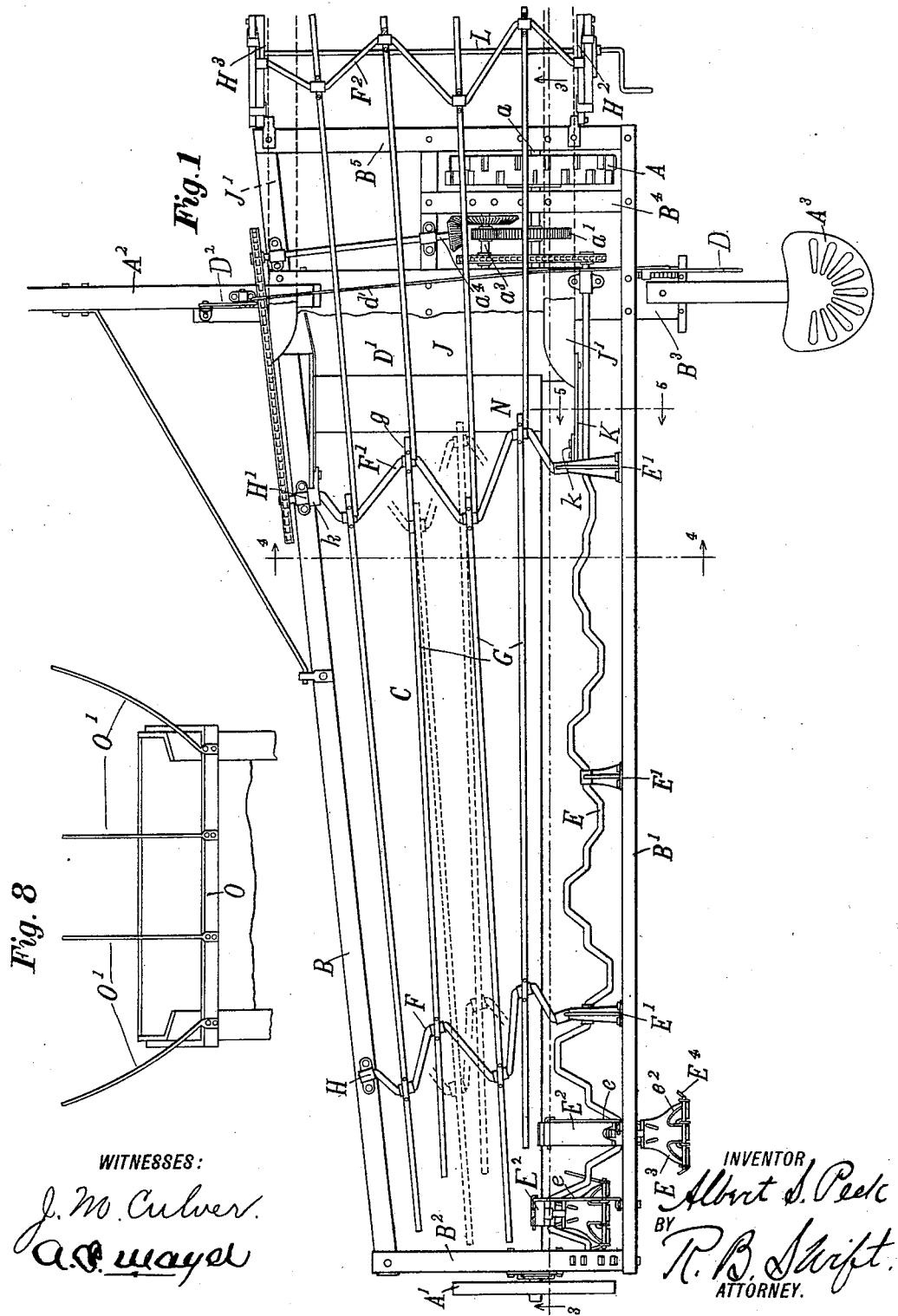
WITNESSES:
J. M. Culver.
A. P. Mayer
INVENTOR
Albert S. Peck
BY
R. B. Shift
ATTORNEY.

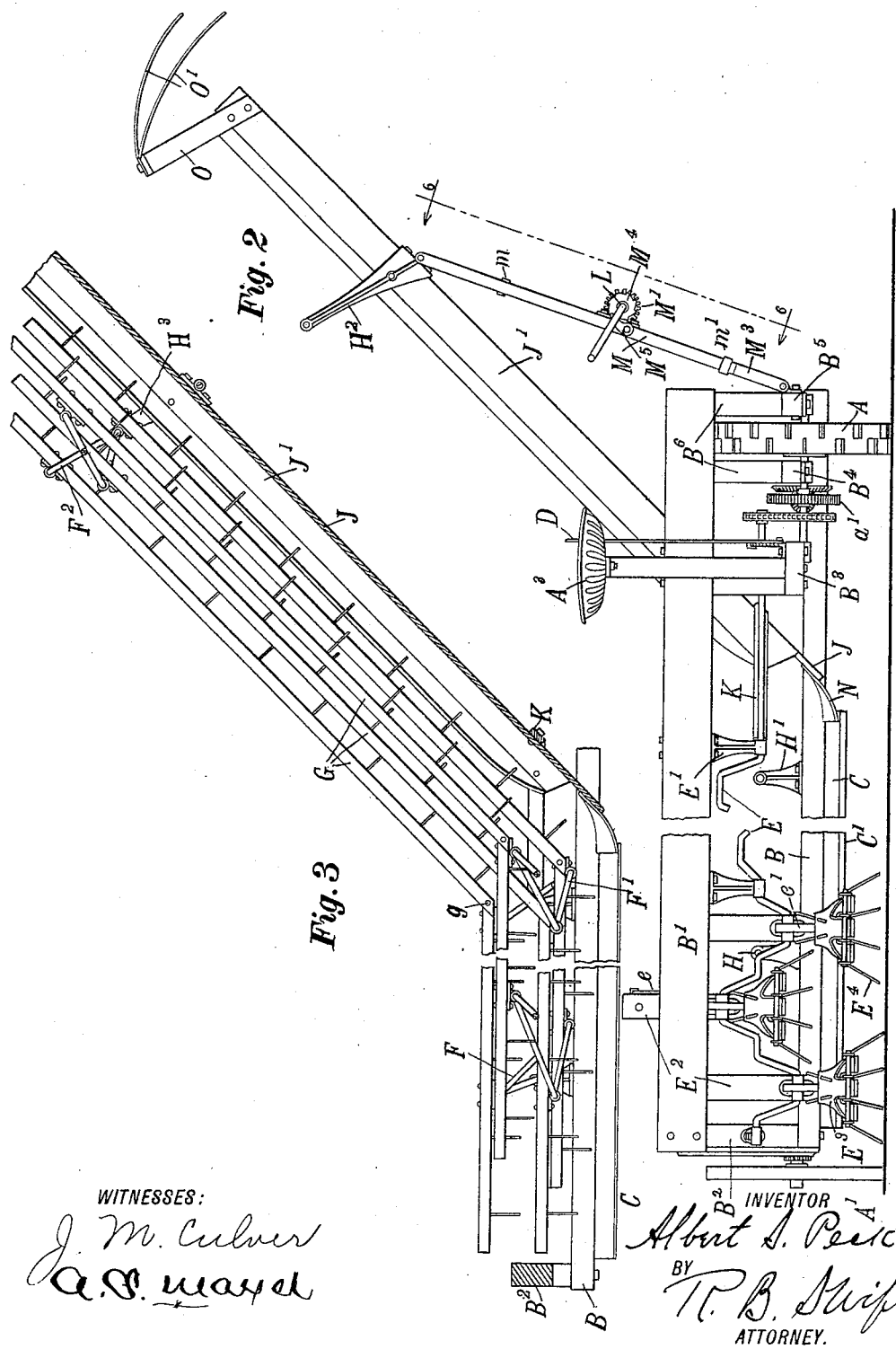

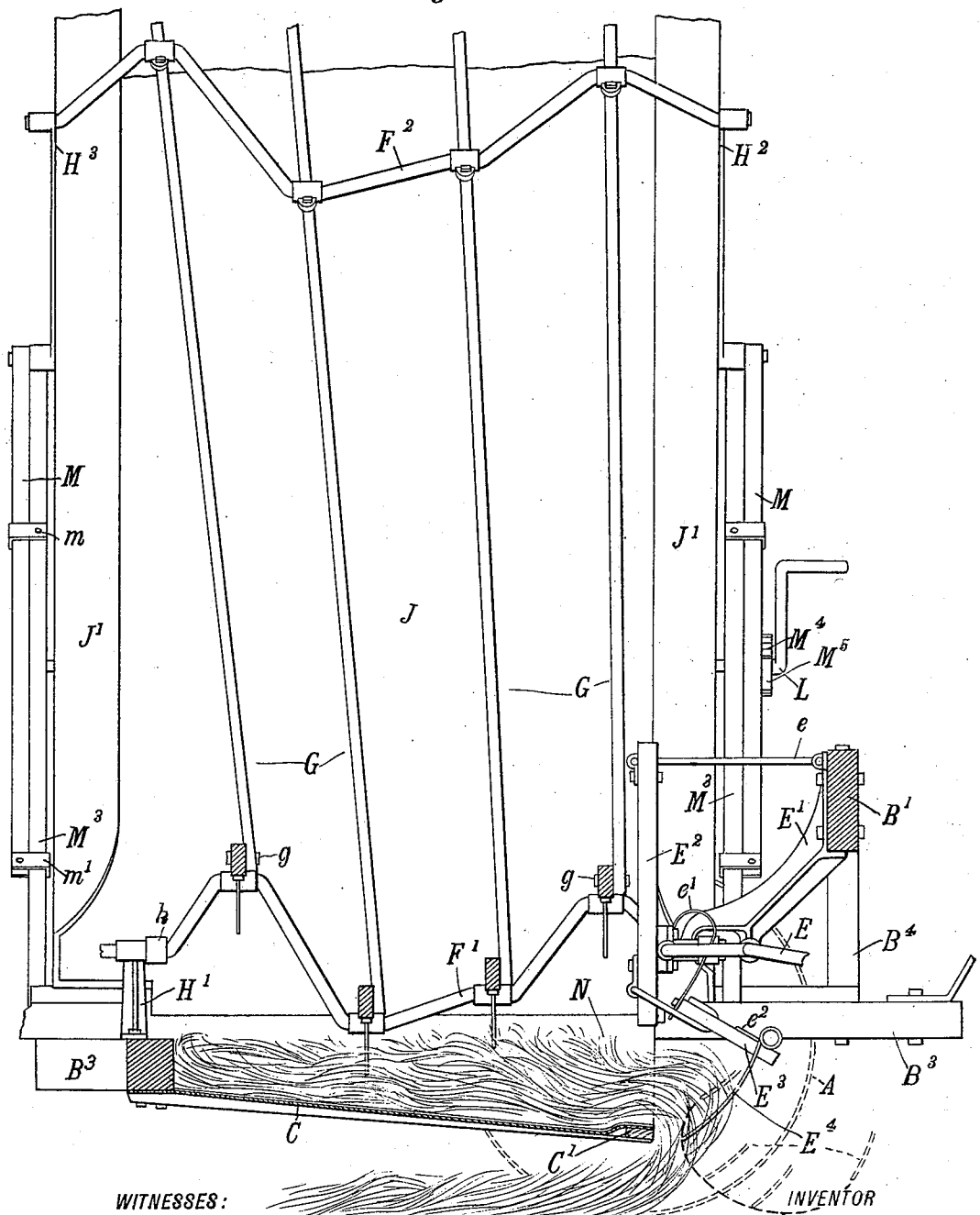

No. 632,021. Patented Aug. 29, 1899.
A. S. PECK.
MACHINE FOR GATHERING AND LOADING HAY.
(Application filed Nov. 27, 1896.)
(No Model.) 4 Sheets—Sheet 4.
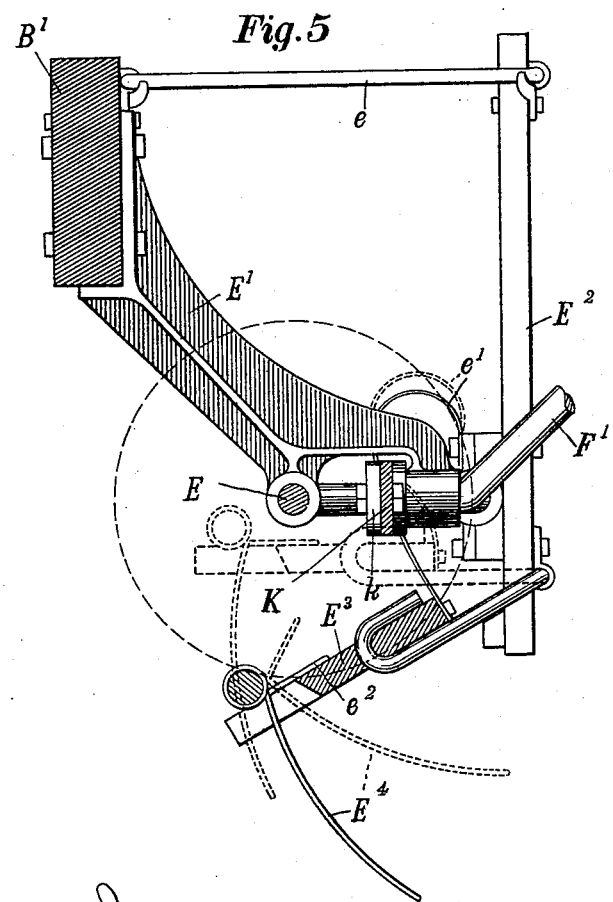
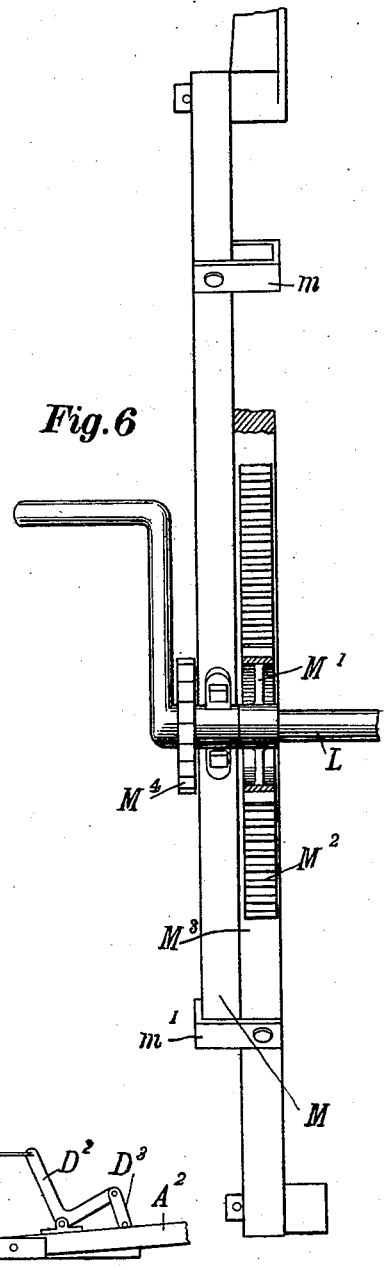
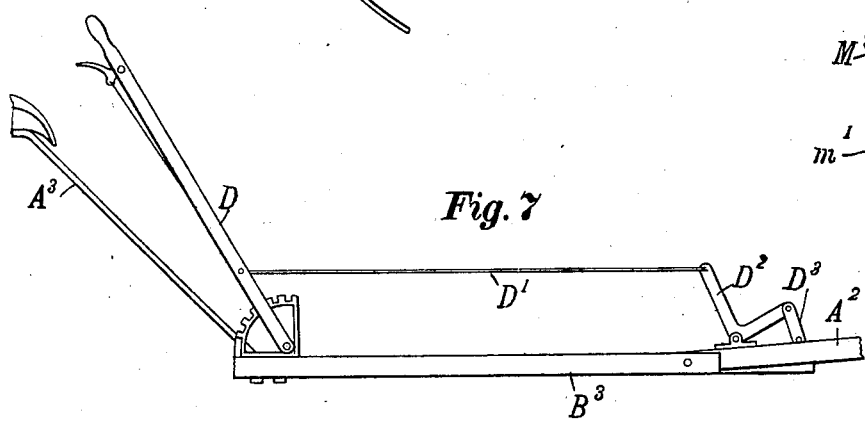
WITNESSES: INVENTOR
Albert S. Peck
BY
R. B. Swift.
ATTORNEY.

United States Patent Office.

ALBERT S. PECK, OF GENEVA, ILLINOIS, ASSIGNOR TO THE McCORMICK HARVESTING MACHINE COMPANY, OF CHICAGO, ILLINOIS.

MACHINE FOR GATHERING AND LOADING HAY.

SPECIFICATION forming part of Letters Patent No. 632,021, dated August 29, 1899.

Application filed November 27, 1896. Serial No. 613,679. (No model.)

*To all whom it may concern:*

Be it known that I, ALBERT S. PECK, a citizen of the United States, residing at Geneva, in the county of Kane and State of Illinois, have invented a new and useful Machine for Gathering and Loading Hay, of which the following is a specification.

My invention relates to improvements in hay raking and loading machines in which gathering-rakes operate in conjunction with carriers that work in a plane at an angle to the rakes; and the object of my invention is to make a practical raking and loading machine that will rake the hay from the swath and load it upon the wagon. The ordinary hay-loading machine will if adapted to gather from the swath fail in loading if the hay is raked into a windrow, while the loader that will pick up a windrow will fail to do clean work in gathering from the swath. The practical type of hay-loader now in use is attached to the hind end of the wagon upon which the hay is to be loaded. When this loader is adapted to gather from the swath, it is not wide enough to take a large amount of hay, and the team must therefore be driven a long distance to accumulate a load. In this connection it should be remembered that the loader is heavy and adds largely to the load that the team must draw, and when long distances must be gone over to accumulate a load the work becomes too great for a pair of horses. With those loaders that are adapted to gather from the windrow it is almost essential that a side delivery-rake be used to rake the hay from the swath into the windrow, thus forming a windrow around the field, as in mowing it is the usual custom to drive around a land or about the field that is being cut. The hay that is first cut of course becomes cured first, and if the windrows are formed at right angles to the direction of travel of the mowing-machine they cannot be loaded without considerable difficulty, as the wagon and loader make an unwieldy vehicle to turn and much time will be lost in getting from windrow to windrow. Again, hay that accidentally falls from the wagon, and in the practical operation of the type of a hay-loader that is drawn from behind the wagon much hay falls off, is wasted unless the field is gone over with a rake after the loader has finished its work. In my invention the hay is raked from the swath by rakes that are adapted to gather hay as it is left by the mowing-machine and the gathering-rakes can be as wide as desired. These rakes carry the hay onto a platform, along which it is moved by carrying devices to an elevator, up which it is transported and delivered to the wagon that is driven beneath the delivery end of the elevator. With my machine after a certain amount of grass has been cut by the mowing-machine, and when it has been sufficiently cured, the work of gathering the hay can be begun, the wagon upon which the hay is to be loaded and the loader itself being driven upon the hay. The raking mechanism of the loader begins at the outside of the field and the hay is transported to the wagon which is traveling on the hay. Any hay that is blown from the wagon by strong winds or that slides from the load thus falls upon the unraked hay and will be taken up by the loader in its next round. The loader can be attached to a projecting arm from the side of the wagon or, as shown in the drawings, it can be fitted with a draft attachment and a team and driver placed upon it. When the hay is loaded upon the rear end of a long hay-wagon, it takes two men to place the hay on the wagon. When, however, it is delivered upon the side of the wagon by a separate team and driver, the loader can deliver the hay at any place upon the wagon that is desired, and one man on the load can do as much work in loading as two. When it is considered that a hay-loader attached to the wagon makes, with a load of hay, too great a load for one team, it is seen that the outfit required to operate my loader is no greater than with ordinary loaders and the advantages of its use are far greater.

In the drawings, which represent one way of constructing my machine, Figure 1 is a plan view showing the machine with some of the rakes attached and with the bottom of the elevator up which the hay passes to the load broken away so as to more clearly show the operative mechanisms of the machine. In dotted lines is shown the position that the forwarding devices of the peculiar type which is illustrated in the drawings occupy when the reciprocating forwarding devices are at the extremes of their movement. Fig. 2 is a rear elevation, the machine being broken in two parts in order to increase the size of the drawings. Fig. 3 is a sectional rear elevation on line 3 3 of Fig. 1, showing more clearly the forwarding-rakes that transport the hay to the wagon. Fig. 4 is an end view looking toward the elevator of the machine on line 4 4 of Fig. 1. Fig. 5 is an enlarged detail showing the ground-rake and in dotted lines showing positions occupied by this rake and its teeth at certain stages in its operation. Fig. 6 is a detailed view of the rack and raising-crank to adjust the elevator to different heights as the load demands. Fig. 7 is a detail of the tilting lever and connecting-rod, while Fig. 8 shows the delivery end of the elevator.

Like letters refer to the same parts throughout the several views.

My improved hay raking and loading machine consists of a long horizontal frame construction supporting a platform upon which the hay is raked and an elevator up which this hay is transported and delivered upon the wagon. The horizontal frame portion of the machine is supported upon the main driving-wheel A, which carries the larger part of the weight of the machine, and the smaller wheel A', that is positioned at the end of the hay-receiving platform. The frame of the machine may be raised or lowered upon the main wheel A and the small wheel A' in any of the many ways that are common in harvesting-machines.

The main or horizontal receiving portion of the machine is somewhat rectangular in form, but is preferably narrower at its outer end than at the end where the hay is delivered upon the elevator, and the reason for constructing the frame in this way is that the outer end of the grain-receiving platform must have capacity only for the hay that is raked at the outer end, while as the hay travels on toward the inner end of the platform it is increasing in amount and more space is required to hold it. The front sill B is therefore positioned at a slight angle to the rear sill B'; so that the outer or small wheel end of the frame will be narrower than the inner or elevator end. The rear sill B' is extended across the rear of the machine and is situated in a plane above that of the front sill, so that the gathering-rakes may have room for operation and the width of the machine be less than it would be were this sill placed in the same horizontal plane as the front sill and to the rear of the gathering-rakes. The rear and front sills are connected at the small-wheel end by the cross-sill B². On the main-wheel end of the machine the wide cross-sill B³ is positioned, to the front end of which the tongue A² is attached and upon the rear of which the seat A³ is positioned. Cross-sills B⁴ and B⁵, one on each side of the main wheel, extend across the machine and serve to bind the framework together and to support the machine. The rear sill B' is supported above the cross-sills by the vertical posts B⁶. A hay-receiving platform C is formed by making a floor of boards or sheet metal by attaching the material to the front sill B and at the rear supporting it on the supplemental lengthwise sill C'. This platform is continued on up the elevator of the machine, as more fully shown in Figs. 2 and 3.

The necessity of raising the machine bodily on the wheels is obviated to some extent by the tilting lever D, which is bolted to the seat-plank convenient to the driver, as shown in Fig. 7. A connecting-rod D' extends from this lever to a bell-crank D², that is attached to the front end of the seat-sill B³ and the other arm is connected to the tongue A² by a short connecting-rod D³. A means is in this way provided so that the machine can be rocked on its axles and the rear or front of the machine brought closer to or farther from the ground. As a means of transmitting motion to the operative parts of the machine the main wheel A is made fast to its axle $a$, upon which is fixedly positioned a spur-wheel $a'$. This spur-wheel in turn meshes with a spur-pinion mounted on a shaft $a^3$, positioned parallel with the main axle and which has bearings in the seat and cross sills. From this shaft motion is transmitted to the raking and transporting devices, as will be hereinafter explained.

On the rear end of the machine, extending the entire length of the hay-receiving platform C, a crank-shaft E is mounted. It has a bearing at its inner end on the seat-sill B³ and at its outer end on the outside sill B². Intermediately between these sills depending brackets E' are dropped from the rear sill B', which support the shaft and in which the shaft revolves. This shaft gives motion to the raking devices which gather the grass from the swath on the ground and raise it, throwing it upon the platform C. In the construction shown in the drawings arms E² are mounted upon cranks on the crank-shaft E. The movement of the upper end of these arms is controlled by a link $e$, which connects them with a fixed part of the machine, which in the drawings is the rear sill B'. Upon the bottom of the arms E² are pivoted the rakes, which are composed of the rake-heads E³ and the rake-tines E⁴. The rake-heads are prevented from dropping too low and are held up on the upward motion of the crank by a connection $e'$. In the drawings this connection is shown as a spring, and it serves the double use of preventing the rake-head from dropping too low and of holding it upon the ground with a flexible pressure when the crank is on its downward sweep. In the drawings each of the rake-heads is shown as carrying four tines, and the tines are shown as pivoted to the rake-heads, so that should the machine be backed while the rake is upon the ground the tines will fall under the rake-head and breakage be prevented. As a convenience in manufacturing two of the tines are made from the same piece of spring-steel, the looped portion $e^2$ being extended beyond the pivot of the tine upon the rake-head, thus preventing the tine from turning to too great an extent upon the pivot because of the striking of the loop extension against the rake-heads $E^3$. Attention is called to the fact that the cranks on the crank-shaft E are not directly opposite each other, so that the rakes upon one side of the cranks will be raking the ground at once while those upon the other side are upon their return, but are spiraled about the shaft to give a more even motion. In order to insure clean raking, the rake-heads $E^3$ are broadened at their extremities and the tines $e^4$ are given an outward pitch, so as to cover as much ground as possible and still allow the returning rake-heads to pass over the rakes that are doing the raking. This is more clearly shown in Fig. 2, where three of the rake-heads are shown, one upon the ground, one approaching the ground, and one in a returning position.

It will be noticed that the rakes just described rake the hay from the rear, lifting it upwardly and throwing it forwardly upon the hay-receiving platform which has passed over it. The platform C inclines downwardly to the rear, so that it will pass over the hay at the front and be as low as possible at the rear to receive the hay. The hay after being thrown upon the platform C can be transported to and up the elevator in any of the many well-known ways. Endless aprons, chains carrying rakes, and vibrating carriers could receive the hay and transport it onward. In the drawings, however, a cheap and effective form of a carrier is illustrated, consisting of a transverse crank-shaft F near the small-wheel side of the machine, F' near the foot of the elevator, and $F^2$ at the head of the elevator. Upon these shafts reciprocating toothed bars G are mounted, and the crank-shafts being revolved the toothed bars are given a reciprocating forwarding motion upon the hay, thus moving it onwardly up the elevator. This form of construction is peculiarly applicable to the type of hay-loader herein described, inasmuch as the receiving ends of the toothed bars can be brought closer together by narrowing the pitch of the cranks on the transverse crank-shaft F and by giving it more of an inclination to the line of advance of the machine than the other shafts. The receiving ends of the toothed bars can be brought closer together where there is but little hay to be moved, and as the volume of hay increases along the receiving-platform the inclination of the next crank can become less and the pitch of the cranks increased, so as to increase the width between the toothed bars, and the hay which is received at the rear of the receiving-platform C as it is thrown up by the rakes from the ground will be taken hold of by the rear reciprocating bar, and as the bars continue their onward motion, advancing, as they, do their plan of movement, the hay will be carried to the front of the receiving-platform and thus go up the elevator in a wide even swath.

In the top view of Fig. 1 the position of the rakes when on the extremes of movement is shown in dotted lines, and the change of plane of the rakes can thus be seen. The transverse crank-shafts F, F', and $F^2$ are positioned in a plane above the plane of the receiving-platform C to a sufficient height, so that the hay which is raked upon the platform will be beneath the toothed bars G. The depending brackets E' at the rear of the machine serve as a support for the rear ends of the transverse cranks F and F', while the front ends of these cranks are supported upon brackets H and H'. The crank at the upper end of the elevator is supported upon posts $H^2$ and $H^3$.

The elevator of the machine consists of the platform J and its side boards J'. The lower end of this elevator is supported upon a bar K, that passes transversely across it and then, bending at a right angle at both ends, extends to the transverse crank-shaft F', where the ends of the bar are pivoted upon this crank-shaft. In the drawings the ends of the bar K are shown bolted to the collars $k$, which are journaled on the crank-shaft F'. The height of the outer end of the elevator is regulated by raising and lowering it, swinging it upon the pivots of the bar K. In the drawings there is shown a means of adjusting the outer end of this elevator, consisting of telescoping posts, one at each side of the elevator, the upper ends of which are attached to the elevator and the lower ends to one of the cross-sills of the machine-frame. As a convenient means of telescoping these posts the crank-shaft L has been provided and is mounted in bearings upon the upper members M of the supporting-posts. This crank-shaft extends across the machine from post to post and has fitted upon it spur-pinions M', one for each of the posts. These pinions are positioned so as to mesh with toothed racks $M^2$, which are fixed upon the face of the lower members $M^3$ of the posts. Upon the outer end of the shaft a fixed ratchet $M^4$ is positioned, and a dog $M^5$ is fastened to the post so as to engage with the ratchet. It is plain that when the crank-shaft L is turned the spur-pinions M', meshing with the racks $M^2$, will telescope the supporting-posts, thus raising or lowering the delivery end of the elevator. The members M M' of the posts are held together by the brackets $m$ and $m'$.

A flexible shield N is fastened to the bottom C of the receiving-platform and extends over the floor J of the elevator and by its flexibility covers the space between these floors, whatever may be the position of the elevator. The toothed bars G are broken at the point where they change their pitch to extend up the elevator and are jointed by the pivot-bolts $g$. Their upper ends being carried upon the transverse crank-shaft $F^2$, which is pivoted in bearings supported on the outer end of the elevator, it is plain that when the elevator is adjusted the outer ends of the toothed bars G will follow, swinging on their pivots $g$.

At the delivery end of the elevator a hood is provided to deflect the hay upon the wagon. In the drawings a bar O is attached to the side boards at each side of the elevator and is extended upwardly, so as to leave sufficient room for the hay to pass beneath it. Guiding-rods O' are fastened to this bar and deflect the hay from the elevator to the wagon, which is to be driven beneath the end of the elevator. Power is transmitted to the toothed bars G by means of a chain which connects a sprocket-wheel on the end of the transverse counter-shaft F' with the sprocket on the transverse shaft $a^4$, which is driven from the shaft $a^3$ by means of a bevel-wheel and bevel-pinion. The crank E, which gives motion to the gathering-rakes, is in turn driven from the shaft $a^3$ by a chain by means of a sprocket-wheel upon the shaft $a^3$ and one upon the shaft E. The transverse shaft $a^4$ is inclined to the direction of the travel of the machine sufficiently so that its sprocket-wheel will line with the sprocket wheel upon the transverse cross-shaft F'.

The description thus far given describes my improved machine, and the drawings show it adapted to rake the hay from the swath and deliver it upon the wagon. In other words, it is shown and described as a hay rake and loader. It is my intention, however, and I have so planned my machine, that the elevator and that part of the toothed rakes that raises the hay on the elevator can be uncoupled from the machine and the hay delivered at one side of the horizontal receiving-platform can fall upon the ground and form a windrow parallel with the direction of movement of the machine. This change is easily accomplished by unbolting the ends of the bar K from the collars $k$ and by unpivoting the delivery end of the tooth-bars G from their pivot-bolts $g$. The flexible shield N is then removed from the bottom C of the receiving-platform, and the hay that is delivered to the side will fall upon the ground between the end of the platform C and the cross-sills and pass beneath the raised rear sill B', forming a continuous windrow around the field. With the rear sill B' in the same horizontal plane as the front sill B it is plain that the hay in the windrow could not pass beneath it and it would be dragged, soon clogging the opening.

The operation of my machine is as follows: A team is attached to the tongue $A^2$ on the machine, or by means of a side brace from the hay-wagon, to which the tongue $A^2$ can be attached, the machine is drawn over the meadow. The team and wagon to receive the hay, as well as the main part of the hay-loader, are driven upon the cut swaths of the field, the outer or small wheel end of the machine raking at the outside edge of the hay-field. The platform of the machine is raised so as to pass over the swath, and the machine is tilted so that the reciprocating rakes driven by the longitudinal crank-shaft at the rear will pick the hay from the ground as it passes beneath the longitudinal platform C and throw it forward upon the platform, where it will be received by the toothed bars G, which will carry it onward and forward up the elevator, beneath the end of which the hay-wagon is driven. The driver of the hay rake and loader can with care deliver the hay upon any part of the load that is required, first building up the front of the load and then dropping back and building up the rear, so that the man upon the load has much less work in the way of moving the hay upon the load than he would have were the hay delivered upon the load at the rear, as in the original type of hay-loader. In loading hay in the field, especially when the hay is heavy and the loader takes a wide swath, the men upon the load are hard pressed to take care of the hay and position it upon the load as fast as it comes to them. The load thus scatters loose hay along where it is being driven and bunches frequently fall from it. In windy days the wind blows the hay to one side and from the load, when it falls upon the ground. In the original type of a loader the hay falls from the wagon beyond the sweep of the loader, and unless the field is again gone over with a horse-rake much hay is wasted. In my plan, however, of driving the load upon the unraked portion of the field and of projecting my rake to one side of the loading mechanism and also of the wagon any hay that falls from the load or that is blown therefrom will drop upon the unraked portion of the field and be picked up in the next round of the loader.

When the machine is to be used as a side-delivery rake, the elevator and its rakes can be disconnected, so as to deliver the hay at the end of the platform. A practical working side-delivery rake can thus be formed. However, as the main object of a side-delivery rake is to place hay in a windrow for a loading-machine, so that the machine and team may go around the field in the loading operation, there would seldom be a time when the user of my improved rake and loader would remove the elevator.

Having now described my invention, what I claim is—

1. In combination in a hay raking and loading machine, a platform mounted upon wheels, and positioned in practically a horizontal plane above that of the hay to be raked, rakes at the rear of the platform adapted to rake and deliver the hay upon the platform, carriers positioned above the platform, and adapted to act on the top of the hay as it is delivered to the platform from the rakes and transport it sidewise and forwardly on the platform, substantially as described.

2. In combination in a hay-loading machine, a horizontal platform mounted upon wheels and positioned crosswise of the path of travel of the machine, a crank-shaft parallel with the platform that extends across the frame of the machine at the rear of the platform, rakes mounted on and actuated by this crank-shaft, and forwarding devices on the platform which work above the hay on the platform and which consist of toothed bars mounted upon cranks, which cranks on the platform are positioned at an angle to the longitudinal crank-shaft upon the rear of the machine.

3. In combination in a hay raking and loading machine, a longitudinal frame mounted upon wheels, a crank-shaft positioned along this frame at its rear side, rakes mounted upon this crank-shaft, a practically horizontal platform positioned on the frame of the machine in front of the rakes, transverse crank-shafts extending across the machine, the cranks at the outer end of the machine being shorter than those at the delivery end of the machine and tooth-bars mounted upon these transverse crank-shafts.

4. In combination in a hay raking and loading machine, a longitudinal machine-frame that is narrowed at its outer or receiving end, a platform located on this frame, rakes adapted to deliver the hay upon this platform, transverse crank-shafts extending across the machine-frame in a plane above that of the platform, the crank-shaft at the receiving end being placed across the platform at an angle to the crank-shafts at the delivery end, and tooth-bars mounted upon these crank-shafts substantially as specified.

5. In combination in a hay raking and loading machine, a longitudinal machine-frame, a platform positioned upon this frame at the front side thereof, a crank-shaft extending across the longitudinal frame at the rear side thereof, rake-bars mounted upon this crank-shaft, the upper ends of which are controlled by a link extending from them to a fixed part of the machine, a rake-head pivoted to the lower ends of the rake-bars and flexibly held in position by a spring extending from the rake-head to the rake-bars, tines pivoted to the rake-heads, and means for transporting the hay longitudinally along the machine.

6. In combination in a hay raking and loading machine, a longitudinal machine-frame having a practically horizontal platform beneath which the swath of hay passes positioned at the front side of the machine-frame, a crank-shaft extending horizontally across the frame at the rear of the platform, rake-bars mounted upon this crank-shaft the upper ends of which are controlled by links, rake-heads pivoted to the lower ends of the bars, flaring tines pivoted on the rake-heads and stops on the tines, and forwarding devices on the platform to move the hay to the side.

7. In combination in a hay raking and loading machine, a longitudinal platform supported upon wheels, the rear sill of which is positioned in a plane above that of the front sill, a platform attached to the front sill, and extending longitudinally across the front of the frame of the machine, a crank-shaft extending longitudinally across the rear of the machine at the rear of the platform, rake-bars mounted on this crank-shaft, the upper ends of which are controlled by links connected to the rear sill, rake-heads pivoted to the lower ends of the rake-bars and at an angle thereto, the rake-heads extending beneath the rear sill when on their rearward strokes, springs attached to the rake-heads and to the rake-bars to hold the heads in position and to flexibly rake the ground, tines pivoted to the rake-heads and forwarding devices on the platform to move the hay toward the end of the machine, substantially as and for the purpose specified.

8. In combination in a hay raking and loading machine, a horizontal frame, a platform attached to the frame, mechanism for raking the hay from the ground upon this platform, crank-shafts upon which are carried forwarding-rakes mounted in bearings on the frame, the crank-shafts which carry the platform-rakes being positioned at an angle to each other.

9. In combination in a hay raking and loading machine, a platform, mechanism for raking the hay from the ground onto the platform, an elevater attached to one end of the platform, crank-shafts carrying rakes mounted across the platform and elevator, the crank-shafts being located at an angle to each other.

10. In combination in a hay raking and loading machine, a horizontal frame, a platform attached to the frame, rakes adapted to rake the hay from the ground upon the platform, crank-shafts positioned in bearings on the frame of the machine and at an angle to the gathering-rakes, an elevator pivoted to the frame of the machine at a point practically concentric with the pivots on the crank-shaft at the delivery end of the platform, toothed bars mounted upon the crank-shafts and adapted to rake the hay along the platform, a crank-shaft positioned at the upper end of the elevator, toothed bars pivoted to the delivery ends of the toothed bars on the platform and to the crank-shaft at the delivery end of the elevator, and means for adjusting the elevator for high and low delivery, substantially as and for the purpose specified.

11. In combination in a hay raking and loading machine, a horizontal rectangular framework mounted upon wheels with gearing thereon to give motion to the operative parts of the machine, a platform positioned on the framework in a plane practically parallel with and above the unraked hay, rakes adapted to rake the hay from the ground and deliver it upon the platform, an elevator pivoted to the machine with means of supporting and adjusting its delivery end, transverse crank-shafts extending across the frame of the machine at an angle to the rakes, the crank-shaft at the outer end of the receiving-platform having a greater angle to the line of advance of the machine than the crank-shaft at the delivery end and having the same number of cranks, toothed bars pivoted to the cranks of these transverse crank-shafts, a crank-shaft at the head of the elevator and toothed bars connecting this crank-shaft with the crank-shaft upon the platform, substantially as and for the purpose specified.

In witness whereof I have hereunto subscribed my name in the presence of two witnesses.

ALBERT S. PECK.

Witnesses:
GEORGE B. ADAMS,
R. B. SWIFT.